United States Patent
Kaneko et al.

(10) Patent No.: US 10,411,351 B2
(45) Date of Patent: Sep. 10, 2019

(54) ANTENNA AND WIRELESS COMMUNICATION DEVICE

(71) Applicant: NEC CORPORATION, Tokyo (JP)

(72) Inventors: Tomoya Kaneko, Tokyo (JP); Eiji Hankui, Tokyo (JP); Hiroshi Toyao, Tokyo (JP); Keishi Kosaka, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 56 days.

(21) Appl. No.: 15/551,814

(22) PCT Filed: Feb. 1, 2016

(86) PCT No.: PCT/JP2016/000492
§ 371 (c)(1),
(2) Date: Aug. 17, 2017

(87) PCT Pub. No.: WO2016/151988
PCT Pub. Date: Sep. 29, 2016

(65) Prior Publication Data
US 2018/0034153 A1    Feb. 1, 2018

(30) Foreign Application Priority Data

Mar. 23, 2015   (JP) ................. 2015-059226

(51) Int. Cl.
*H01Q 5/335* (2015.01)
*H01Q 1/50* (2006.01)
(Continued)

(52) U.S. Cl.
CPC .............. *H01Q 5/335* (2015.01); *H01Q 1/24* (2013.01); *H01Q 1/38* (2013.01); *H01Q 1/50* (2013.01);
(Continued)

(58) Field of Classification Search
CPC ............ H01Q 5/335; H01Q 1/50; H01Q 1/38; H01Q 1/24
(Continued)

(56) References Cited

U.S. PATENT DOCUMENTS

| | | | |
|---|---|---|---|
| 2006/0262028 A1* | 11/2006 | Takei | H01Q 1/241 343/850 |
| 2009/0256971 A1* | 10/2009 | Wu | H04N 5/4446 348/731 |
| 2013/0016841 A1* | 1/2013 | Fong | H04L 5/001 380/287 |

FOREIGN PATENT DOCUMENTS

| | | |
|---|---|---|
| JP | 2003-110345 A | 4/2003 |
| JP | 2004-112397 A | 4/2004 |

(Continued)

OTHER PUBLICATIONS

International Search Report for PCT/JP2016/000492 dated Apr. 5, 2016 [PCT/ISA/210].
(Continued)

*Primary Examiner* — Hai V Tran
(74) *Attorney, Agent, or Firm* — Sughrue Mion, PLLC

(57) ABSTRACT

To provide a compact antenna capable of corresponding to a plurality of frequency bands. In a first frequency characteristic adjustment unit, the susceptance thereof varies according to a frequency of an input signal. A second frequency characteristic adjustment unit is connected to the first frequency characteristic adjustment unit and the reactance thereof varies according to the frequency of the input signal. A third frequency characteristic adjustment unit is connected to the second frequency characteristic adjustment unit, the susceptance thereof varies according to the frequency of the input signal. A feeding unit is configured to input a signal of any frequency in a plurality of different frequencies to the second frequency characteristic adjust-
(Continued)

ment unit. A sign of the reactance of the second frequency characteristic adjustment unit at the frequency of the signal input from the feeding unit is the same as those of the susceptances of the first frequency characteristic adjustment unit and the third frequency characteristic adjustment unit.

14 Claims, 7 Drawing Sheets

(51) Int. Cl.
  *H01Q 1/38* (2006.01)
  *H01Q 1/24* (2006.01)
  *H04B 1/00* (2006.01)
  *H04B 1/40* (2015.01)
  *H04B 1/18* (2006.01)

(52) U.S. Cl.
  CPC ............ *H04B 1/00* (2013.01); *H04B 1/0053* (2013.01); *H04B 1/18* (2013.01); *H04B 1/40* (2013.01)

(58) Field of Classification Search
  USPC .................................................. 343/745, 850
  See application file for complete search history.

(56) References Cited

FOREIGN PATENT DOCUMENTS

| | | |
|---|---|---|
| JP | 2005-150876 A | 6/2005 |
| JP | 2011-176653 A | 9/2011 |
| WO | 2004/036687 A1 | 4/2004 |

OTHER PUBLICATIONS

Written Opinion for PCT/JP2016/000492 dated Apr. 5, 2016 [PCT/ISA/237].

\* cited by examiner

ANTENNA AND WIRELESS COMMUNICATION DEVICE

CROSS REFERENCE TO RELATED APPLICATIONS

This application is a National Stage of International Application No. PCT/JP2016/000492 filed Feb. 1, 2016, claiming priority based on Japanese Patent Application No. 2015-059226 filed Mar. 23, 2015, the contents of all of which are incorporated herein by reference in their entirety.

TECHNICAL FIELD

The present invention relates to an antenna and a wireless communication device.

BACKGROUND ART

In recent years, devices using large capacity wireless communication such as a cellular phone are spreading. In such wireless communication, a predetermined band is divided into a plurality of bands and communication is performed in each band to increase communication capacity. However, when antennas corresponding to each of a plurality of bands are used, a communications device or communication terminal becomes larger. Thus, an antenna capable of corresponding to a plurality of bands has been proposed.

For example, a multi-band antenna in which a plurality of antennas corresponding to each of a plurality of bands are disposed and a plurality of antennas are selectively used without using an antenna duplexer (Patent Literature 1). In this antenna, a feeding end of one feeding line and a plurality of antenna units having different resonant frequencies are directly connected by micro strip lines. Then, by providing the micro strip lines with filter functions, the antenna units and the filters are integrally formed. An impedance of the micro strip line can be set by adjusting a line length of the micro strip line and by providing the micro strip line with a plurality of stubs.

Further, an antenna device that can easily adjust a plurality of resonant frequencies has been proposed (Patent Literature 2). The antenna device includes a T-shape element and a stub. The T-shape element includes a first end serving as a feeding point. The T-shape element is branched at the midpoint to include a second end and a third end. One end of the stub is connected between the midpoint and the second end and the other end is grounded. The stub and the T-shape element form a it-shape. Then, a first line length from the first end to the second end is longer than a second line length from the first end to the third end. The first line length and the second line length are lengths corresponding to a first resonant frequency and a second resonant frequency, respectively. Accordingly, this antenna can correspond to two signals of the first resonant frequency and the second resonant frequency.

Furthermore, an antenna element that can improve radiation efficiency regardless of a shape of a circuit board conductor and achieve a wider bandwidth has been proposed (Patent Literature 3). This antenna element includes a $\lambda/2$ radiation electrode disposed on a base surface made of dielectric material. The $\lambda/2$ radiation electrode extends from the center of the base surface in directions symmetrical to each other. A ground conductor line is connected to the vicinity of the center of the $\lambda/2$ radiation electrode, and a feeding conductor line is connected to a position at a predetermined distance from the center part of the $\lambda/2$ radiation electrode. At least one of both ends of the $\lambda/2$ radiation electrode is an open end. According to this configuration, it is possible to achieve impedance matching between the radiation electrode and a high-frequency signal source by adjusting a layout of the feeding conductor line and the ground conductor line. Therefore, it is possible to achieve the wider bandwidth.

CITATION LIST

Patent Literature

[Patent Literature 1] Japanese Unexamined Patent Application Publication No. 2004-112397
[Patent Literature 2] Japanese Unexamined Patent Application Publication No. 2011-176653
[Patent Literature 3] Japanese Unexamined Patent Application Publication No. 2003-110345

SUMMARY OF INVENTION

Technical Problem

However, the inventors have found out problems described below in the above-described technologies. In Patent Literature 1, impedance matching is performed with the length of the micro strip line connected to the antenna unit and a plurality of stubs. Therefore, the antenna unit, the micro strip line and a plurality of stubs are required for each corresponding frequency so that it is difficult to miniaturize a device. Further, from the viewpoint of each frequency, since unnecessary elements are arranged at a short distance, it is concerned that characteristics deteriorate due to the interference among the elements. In Patent Literature 2, since the arrangement and the length of the line correspond to a plurality of resonance frequencies, the arrangement and the length of the line are limited. In Patent Literature 3, although the layout of the feeding conductor line and the ground conductor line can be adjusted, it is impossible to correspond to a plurality of bands with one antenna element in the first place.

The present invention has been made in view of the aforementioned circumstances and aims to provide a compact antenna capable of corresponding to a plurality of frequency bands.

Solution to Problem

An aspect of the present invention is an antenna including: a first frequency characteristic adjustment unit whose susceptance varies in response to a frequency of an input signal; a second frequency characteristic adjustment unit connected to the first frequency characteristic adjustment unit, a reactance of the second frequency characteristic adjustment unit varying in response to the frequency of the input signal; a third frequency characteristic adjustment unit connected to the second frequency characteristic adjustment unit, a susceptance of the third frequency characteristic adjustment unit varying in response to the frequency of the input signal; and a feeding unit configured to input a signal of any frequency in a plurality of different frequencies to the second frequency characteristic adjustment unit; in which a sign of the reactance at the frequency of the signal input from the feeding unit is the same as a sing of the susceptance.

An aspect of the present invention is a wireless communication device including: an antenna capable of corresponding to a plurality of frequencies; a baseband unit configured to output a baseband signal before modulation and receive a signal generated by demodulating a received signal; and an RF unit configured to modulate the baseband signal to output a transmission signal to the antenna and output the signal generated by demodulating the received signal received from the antenna to the baseband unit, in which the antenna includes: a first frequency characteristic adjustment unit whose susceptance varies in response to a frequency of an input signal; a second frequency characteristic adjustment unit connected to the first frequency characteristic adjustment unit, a reactance of the second frequency characteristic adjustment unit varying in response to the frequency of the input signal; a third frequency characteristic adjustment unit connected to the second frequency characteristic adjustment unit, a susceptance of the third frequency characteristic adjustment unit varying in response to the frequency of the input signal; and a feeding unit configured to input a signal of any frequency in a plurality of different frequencies to the second frequency characteristic adjustment unit, and a sign of the reactance at the frequency of the signal input from the feeding unit is the same as a sign of the susceptance.

Advantageous Effects of Invention

According to the present invention, it is possible to provide a compact antenna capable of corresponding to a plurality of frequency bands.

DESCRIPTION OF EMBODIMENTS

Figure 1:
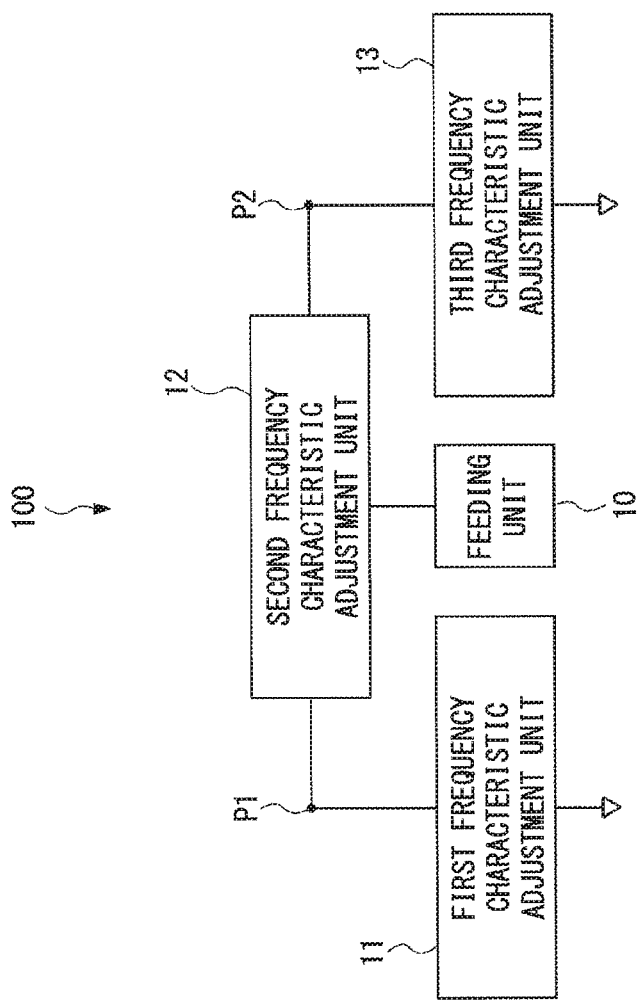
FIG. 1 is a block diagram illustrating a basic configuration of an antenna 100 according to a first exemplary embodiment.

Exemplary embodiments of the present invention will be described below with reference to the drawings. The same components are denoted by the same reference numerals throughout the drawings, and a repeated explanation is omitted as needed.

First Exemplary Embodiment

Figure 2:
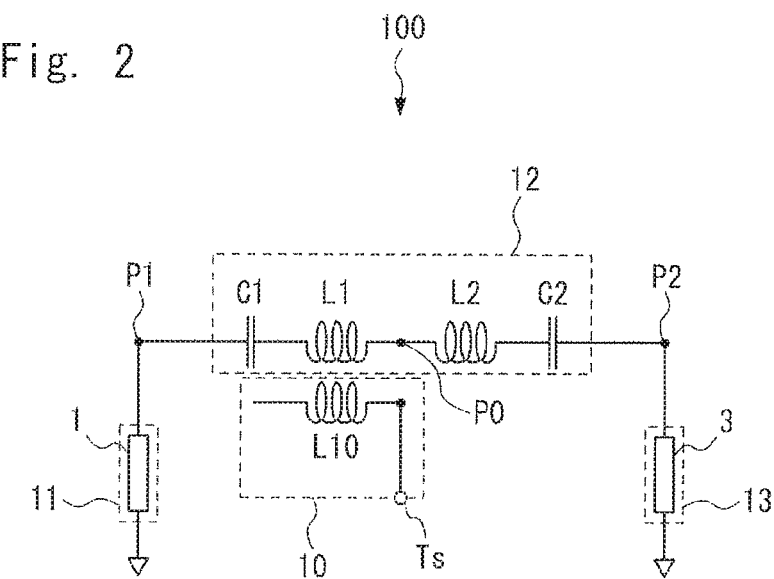
FIG. 2 is a circuit diagram schematically illustrating a configuration of the antenna according to the first exemplary embodiment.

An antenna 100 according to a first exemplary embodiment will be described. The antenna 100 is configured as an antenna capable of corresponding to high frequency signals of a plurality of frequency bands. FIG. 1 is a block diagram illustrating a basic configuration of the antenna 100 according to the first exemplary embodiment. FIG. 2 is a circuit diagram schematically illustrating a configuration of the antenna 100 according to the first exemplary embodiment. The antenna 100 includes a first frequency characteristic adjustment unit 11, a second frequency characteristic adjustment unit 12, a third frequency characteristic adjustment unit 13 and a feeding unit 10.

The first frequency characteristic adjustment unit 11 includes a short stub 1 connected between an open point P1 and a ground. Hereinafter, the short stub 1 is referred to as a first short stub.

The second frequency characteristic adjustment unit 12 includes inductors L1 and L2, and capacitors C1 and C2. Hereinafter, the inductors L1 and L2 are referred to as a first inductor and a second inductor, respectively. The capacitors C1 and C2 are referred to as a first capacitor and a second capacitor, respectively. The inductor L1 and the inductor L2 are connected in series via a center point P0. The capacitor C1 is connected between the inductor L1 and the open point P1. The capacitor C2 is connected between the inductor L2 and an open point P2. Note that the open point P1 and the open point P2 are arranged at positions facing each other across the center point P0.

The third frequency characteristic adjustment unit 13 includes a short stub 3 connected between the open point P2 and the ground. Hereinafter, the short stub 3 is referred to as a second short stub.

The feeding unit 10 is a circuit for feeding the antenna 100. In FIG. 2, the feeding unit 10 includes an inductor L10 mutually inductively coupled with the inductor L1. The high frequency signal can be induced in the inductor L1 mutually inductively coupled with the inductor L10 by applying the high frequency signal to the inductor L10 via a feeding terminal Ts. The feeding unit 10 can input the high frequency signal of a predetermined frequency band in a plurality of the frequency bands.

Next, an operation of the antenna 100 will be described. Here, it is assumed that a signal on a low frequency side (a frequency f1) or a signal on a high frequency side (a frequency f2) is input to the antenna 100.

Here, an admittance of the short stub 1 (the first frequency characteristic adjustment unit 11) is Y1. A reactance of the second frequency characteristic adjustment unit 12 is X2. An admittance of the short stub 3 (the third frequency characteristic adjustment unit 13) is Y3. In this case, in order for the antenna 100 to function as the antenna, considering the impedance when viewed from the open point P1, it is necessary to satisfy the following expression (1).

[Expression 1]

$$\frac{1}{\frac{1}{Y1}+X2}+Y3=0 \qquad (1)$$

Considering the impedance when viewed from the open point P2, it is also necessary to satisfy the following expression (2).

[Expression 2]

$$\frac{1}{\frac{1}{Y3}+X2} + Y1 = 0 \qquad (2)$$

Note that the expression (2) is obtained by modifying the expression (1), and the following expression (3) is obtained by modification.

[Expression 3]

$$\frac{1}{Y1} + \frac{1}{Y3} + X2 = 0 \qquad (3)$$

In general, in the reactance X2, an inductive reactance XL due to the inductors L1 and L2 is expressed by the following expression (4) using a complex number j with an inductance L and a frequency f.

[Expression 4]

$$XL = j2\pi fL \qquad (4)$$

Further, in general, in the reactance X2, a capacitive reactance XC due to the capacitors C1 and C2 is expressed by the following expression (5) using the complex number j with an capacitance C.

[Expression 5]

$$XC = \frac{1}{j2\pi fC} = -\frac{j}{2\pi fC} \qquad (5)$$

Thus, when the frequency is low (the frequency f1), an absolute value of the inductive reactance XL becomes small and an absolute value of the capacitive reactance XC becomes large. Therefore, an effect of the capacitive reactance XC becomes dominant and a sign of the reactance X2(f1) at the frequency f1 is negative.

Meanwhile, when the frequency is high (the frequency f2), the absolute value of the inductive reactance XL becomes large and the absolute value of the capacitive reactance XC becomes small. Therefore, an effect of the inductive reactance XL becomes dominant and a sign of the reactance X2(f2) at the frequency f2 is positive.

Further, in the antenna 100, since the short stub 1 is a transmission line one end of which is grounded, the admittance Y1 of the short stub 1 is expressed by the following expression (6) in which Y0 is a reciprocal of a characteristic impedance of the transmission line constituting the stub, β is a phase constant, and l is a length of the short stub 1.

[Expression 6]

$$Y1 = -jY0\cot\beta l \qquad (6)$$
$$= -jY0\cot\theta$$
$$= -jY0\cot2\pi\frac{l}{\lambda}$$

Since the short stub 3 is the same short stub as the short stub 1, the admittance Y3 of the short stub 3 is expressed by the following expression (7) as in the expression (6).

[Expression 7]

$$Y3 = -jY0\cot\beta l \qquad (7)$$
$$= -jY0\cot\theta$$
$$= -jY0\cot2\pi\frac{l}{\lambda}$$

Figure 3:
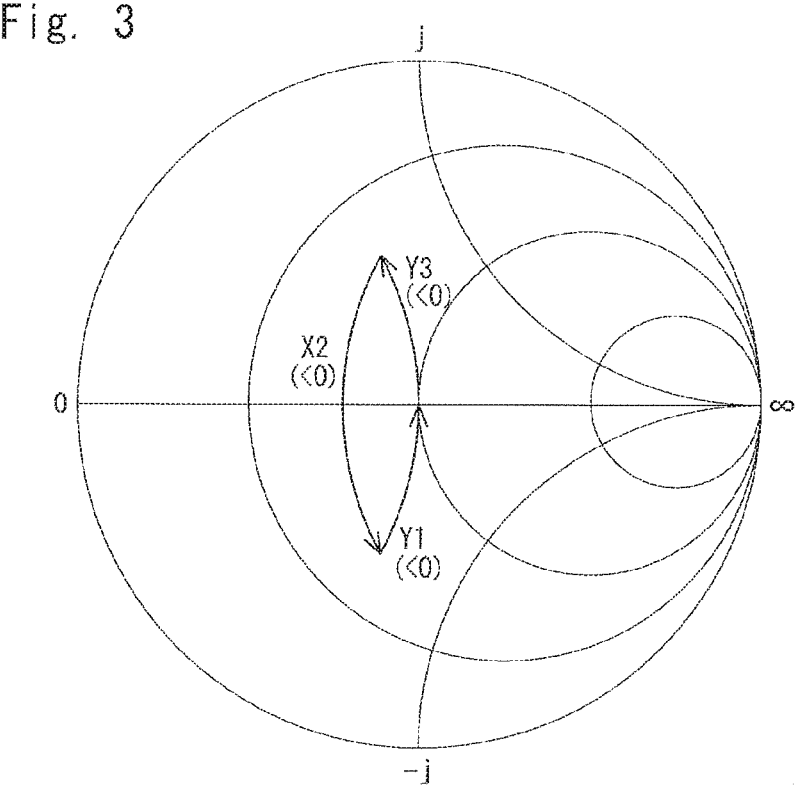
FIG. 3 is a smith chart schematically illustrating a relation between a reactance X2(f1) and admittances Y1(f1) and Y3(f1) when a frequency is low (a frequency f1)

From the expressions (6) and (7), when the length l of the short stubs 1 and 3 is shorter than a quarter of a wavelength λ of the high frequency signal, that is, when the frequency is low (the frequency f1), the sign of the reactance X2(f1) is negative and the imaginary parts of the admittances Y1(f1) and Y3(f1), or the signs of the susceptances, are negative. Therefore, at the frequency f1 that is a certain frequency, the reactance X2(f1) and the admittances Y1(f1) and Y3(f1) cancel each other to satisfy the expressions (1) to (3). FIG. 3 is a smith chart schematically illustrating a relation between the reactance X2(f1) and the admittances Y1(f1) and Y3(f1) when the frequency is low (the frequency f1). As illustrated in FIG. 3, it can be understood that, by satisfying the expressions (1) to (3), the reactance X2(f1) and the admittances Y1(f1) and Y3(f1) cancel each other.

Figure 4:
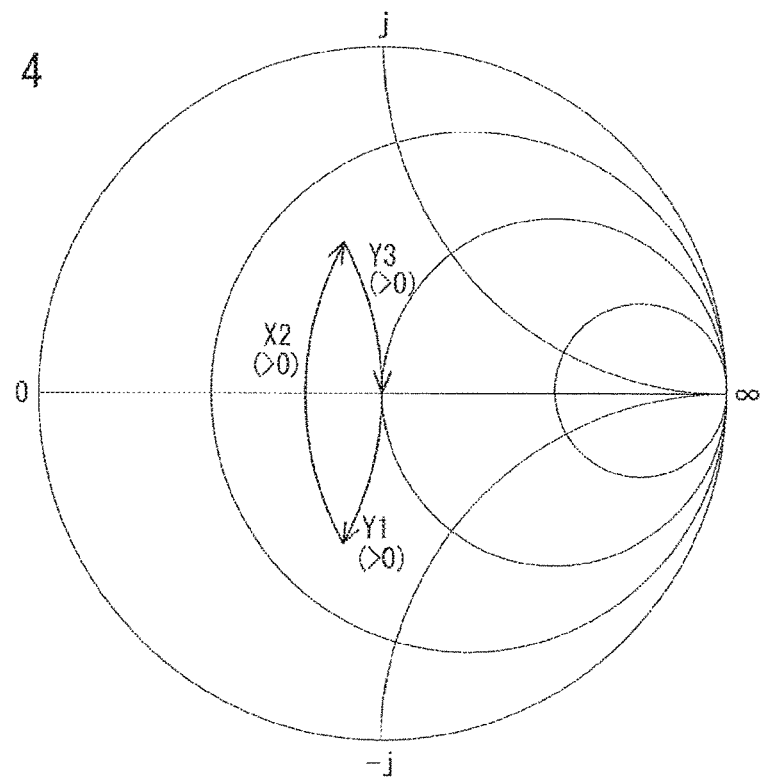
FIG. 4 is a smith chart schematically illustrating a relation between a reactance X2(f2) and admittances Y1(f2) and Y3(f2) when a frequency is high (a frequency f2)

From the expressions (6) and (7), when the length l of the short stubs 1 and 3 is larger than the quarter of the wavelength λ of the high frequency signal, that is, when the frequency is high (the frequency f2), the sign of the reactance X2(f2) is positive and the imaginary parts of the admittances Y1(f2) and Y3(f2), or the signs of the susceptances, are positive. Therefore, at the frequency f2 that is a certain frequency, the reactance X2(f2) and the admittances Y1(f2) and Y3(f2) cancel each other to satisfy the expressions (1) to (3). FIG. 4 is a smith chart schematically illustrating a relation between the reactance X2(f2) and the admittances Y1(f2) and Y3(f2) when the frequency is high (the frequency f2). As illustrated in FIG. 4, it can be understood that, by satisfying the expressions (1) to (3), the reactance X2(f2) and the admittances Y1(f2) and Y3(f2) cancel each other.

As described above, the sign of the reactance of the second frequency characteristic adjustment unit 12 is negative in the case of the low frequency (f1) and positive in the case of the high frequency (f2). The signs of the imaginary parts of the admittances of the first frequency characteristic adjustment unit 11 and the third frequency characteristic adjustment unit 13, or the signs of the susceptances, are negative in the case of the low frequency (f1) and positive in the case of the high frequency (f2).

In other words, for each frequency, the sign of the reactance of the second frequency characteristic adjustment unit 12 is opposite to the signs of the reactances of the first frequency characteristic adjustment unit 11 and the third frequency characteristic adjustment unit 13.

Further, impedance matching when viewed from the open points P1 and P2 can be achieved by designing the inductors L1 and L2, the capacitors C1 and C2, and the short stubs 1 and 3 to satisfy the above-described expressions (1) to (3).

As described above, the antenna 100 can correspond to both of the low frequency (f1) and the high frequency (f2) with a simple configuration. As a result, according to the configuration, it is possible to provide a compact antenna capable of corresponding to a plurality of the frequency bands.

Second Exemplary Embodiment

Figure 5:
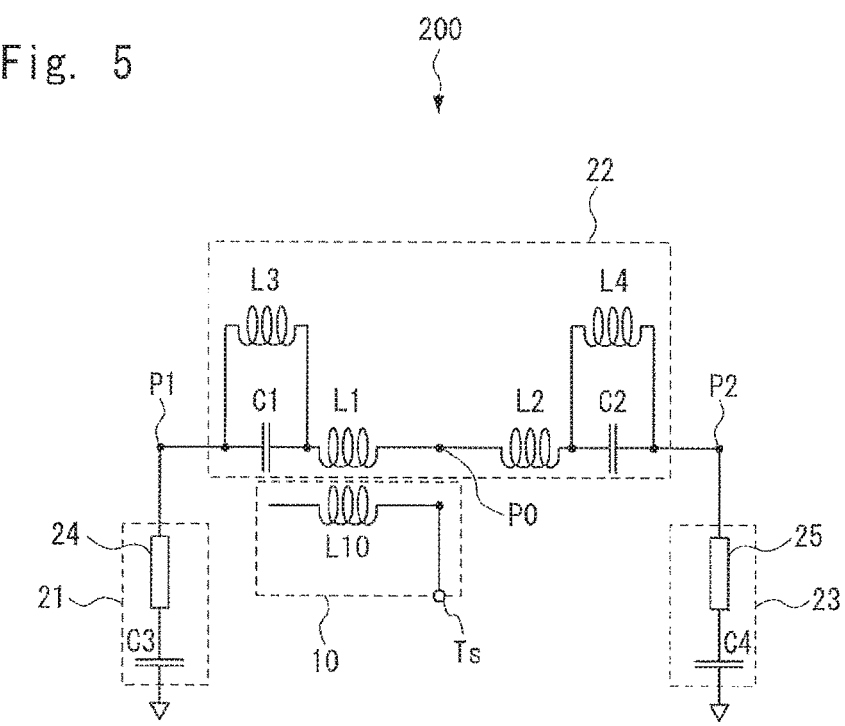
FIG. 5 is a circuit diagram schematically illustrating a configuration of an antenna according to a second exemplary embodiment.

An antenna 200 according to a second exemplary embodiment will be described. FIG. 5 is a circuit diagram schematically illustrating a configuration of the antenna 200 according to the second exemplary embodiment. The antenna 200 has a configuration in which the first frequency characteristic adjustment unit 11, the second frequency characteristic adjustment unit 12 and the third frequency characteristic adjustment unit 13 of the antenna 100 according to the first exemplary embodiment are replaced with a first frequency characteristic adjustment unit 21, a second frequency characteristic adjustment unit 22 and a third frequency characteristic adjustment unit 23, respectively.

The first frequency characteristic adjustment unit 21 includes a transmission line 24 and a capacitor C3. The transmission line 24 corresponds to the short stub 1 of the first frequency characteristic adjustment unit 11. The first frequency characteristic adjustment unit 21 has a configuration in which the transmission line 24 constituting the short stub 1 is terminated by the capacitor C3. Hereinafter, the capacitor C3 is also referred to as a third capacitor. The transmission line 24 is also referred to as a first transmission line.

The second frequency characteristic adjustment unit 22 has a configuration in which inductors L3 and L4 are added to the second frequency characteristic adjustment unit 12 according to the first exemplary embodiment. Hereinafter, the inductors L3 and L4 are also referred to as third and fourth inductors, respectively. The inductor L3 is connected to the capacitor C1 in parallel. The inductor L4 is connected to the capacitor C2 in parallel. As the other configuration of the second frequency characteristic adjustment unit 22 is the same as that of the second frequency characteristic adjustment unit 12, a description thereof will be omitted.

The third frequency characteristic adjustment unit 23 includes a transmission line 25 and the capacitor C4. The transmission line 25 corresponds to the short stub 3 of the third frequency characteristic adjustment unit 13. The third frequency characteristic adjustment unit 23 has a configuration in which the transmission line 25 constituting the short stub 3 is terminated by the capacitor C4. Hereinafter, the capacitor C4 is also referred to as a fourth capacitor. The transmission line 25 is also referred to as a second transmission line.

Next, an operation of the antenna 200 will be described. A frequency f3 that is lower than the frequency f1 is considered. In this case, when focusing on the capacitor C1 and the inductor L3 connected in parallel in the second frequency characteristic adjustment unit 22, a reactance of the capacitor C1 becomes infinite as the value of the frequency f3 becomes lower, so that the signal cannot be substantially conducted. Meanwhile, since the inductor L3 can conduct the signal, a contribution of the inductor L3 is more dominant than that of the capacitor C1 at the frequency f3. The similar relation is also established for the capacitor C2 and the inductor L4. Therefore, in this case, since the contribution of the inductor in the second frequency characteristic adjustment unit 22 becomes dominant, the reactance X2 of the second frequency characteristic adjustment unit 22 at the frequency f3 is positive.

In contrast, in the first frequency characteristic adjustment unit 21, the admittance Y1 of the transmission line 24 terminated by the capacitor C3 is expressed by the following expression (8). Note that, in the expression (8), ω is an angular frequency, and is represented by ω=2πf.

[Expression 8]

$$Y1 = Y0\frac{Y0 - j(j\omega C3)\cot(\beta l)}{(j\omega C3) - jY0\cot(\beta l)}$$

$$= j\omega C3\frac{\left\{\cot(\beta l) + \frac{Y0}{\omega C3}\right\}}{\left\{\cot(\beta l) - \frac{\omega C3}{Y0}\right\}}$$

(8)

In the expression (8), when the frequency f3 satisfies λ3>2πl/arc cot(ωC3/Y0) with respect to its wavelength λ3, the first frequency characteristic adjustment unit 21 appears almost as the capacitor C3. Similarly, the third frequency characteristic adjustment unit 23 appears almost as the capacitor C4. Therefore, the imaginary part of the admittance of the first frequency characteristic adjustment unit 21, or the susceptance, is positive at the frequency f3. Similarly, the imaginary part of the admittance of the third frequency characteristic adjustment unit 23, or the susceptance, is positive at the frequency f3.

Further, when the frequency f1 satisfies 2πl/arc cot(−Y0/ωC3)<λ1<2πl/arc cot(ωC3/Y0) with respect to its wavelength λ1, the imaginary parts of the admittance of the first frequency characteristic adjustment unit 21 and the third frequency characteristic adjustment unit 23, or the susceptances, are negative at the frequency f1. When the frequency f2 satisfies 2πl/(π+arc cot(ωC3/Y0))<λ2<2πl/arc cot(−Y0/ωC3), the imaginary parts of the admittance of the first frequency characteristic adjustment unit 21 and the third frequency characteristic adjustment unit 23, or the susceptances, are negative at the frequency f2. Thus, in this condition, by satisfying the expressions (1) to (3), the antenna 200 satisfies resonance conditions at the frequencies f1, f2 and f3, so that the antenna 200 can function as the antenna.

As described above, according to the present configuration, the antenna satisfying the resonance condition at each of three frequencies can be achieved. Further, since it is sufficient to add only the inductors and capacitors, it is possible to correspond to more frequency bands while suppressing increases in circuit area and manufacturing cost.

Third Exemplary Embodiment

An antenna 300 according to a third exemplary embodiment will be described. The antenna 300 has a configuration in which the feeding unit 10 of the antenna 100 according to the first exemplary embodiment is replaced with a feeding unit 30. As the other configuration of the antenna 300 is the same as that of the antenna 100, a configuration of the feeding unit 30 will be described here.

Figure 6:
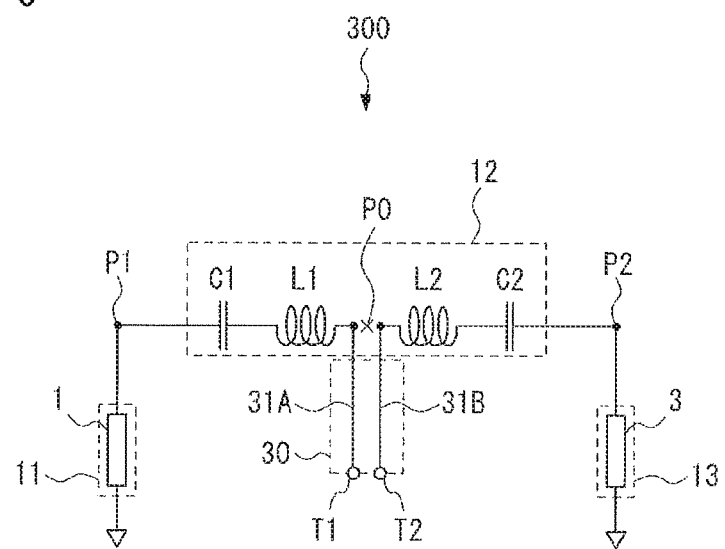
FIG. 6 is a circuit diagram schematically illustrating a configuration of an antenna according to a third exemplary embodiment.

FIG. 6 is a circuit diagram schematically illustrating a configuration of the antenna 300 according to the third exemplary embodiment. The feeding unit 30 includes two feeding lines 31A and 31B directly connected to the second frequency characteristic adjustment unit 12. Hereinafter, the feeding lines 31A and 31B are referred to as a first feeding line and a second feeding line, respectively. One end of the feeding line 31A is connected to an end of the inductor L1 on a side of the center point P0. One end of the feeding line 31B is connected to an end of the inductor L2 on the side of the center point P0. Signals of opposite phases are input to the other end of the feeding line 31A and the other end of the feeding line 31B, respectively. For example, a normal phase signal is input to the feeding line 31A via a terminal T1 and a reversed phase signal is input to the feeding line 31B via a terminal T2. That is, the feeding unit 30 is configured as a feeding unit for performing balancing-feeding to the antenna 300.

As described above, according to the present configuration, even by using the feeding unit to which the feeding line is directly connected for performing the balancing-feeding, it is possible to achieve the antenna similar to the antenna of the first exemplary embodiment.

Fourth Exemplary Embodiment

Figure 7:
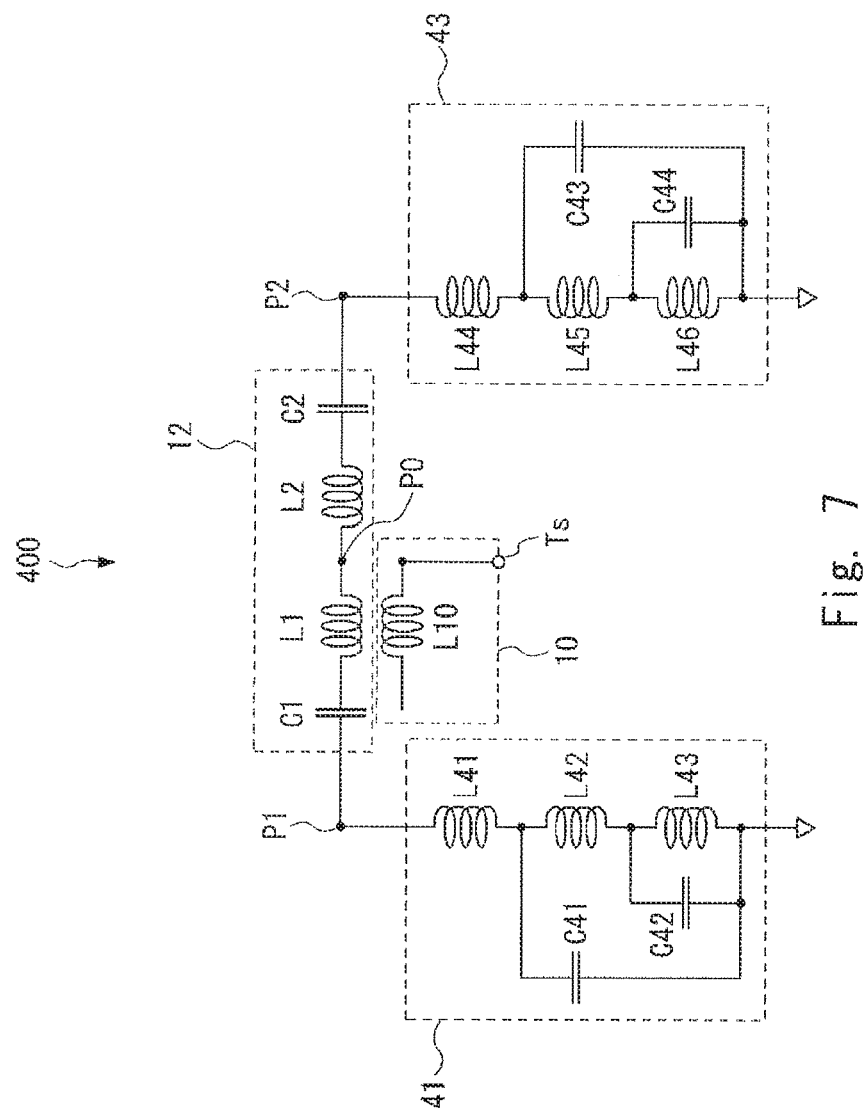
FIG. 7 is a circuit diagram schematically illustrating a configuration of an antenna according to a fourth exemplary embodiment.

An antenna 400 according to a fourth exemplary embodiment will be described. FIG. 7 is a circuit diagram schematically illustrating a configuration of the antenna 400 according to the fourth exemplary embodiment. The antenna 400 has a configuration in which the first frequency characteristic adjustment unit 11 and the third frequency characteristic adjustment unit 13 of the antenna 100 according to the first exemplary embodiment are replaced with a first frequency characteristic adjustment unit 41 and a third frequency characteristic adjustment unit 43, respectively. As the other configuration of the antenna 400 is the same as that of the antenna 100, configurations of the first frequency characteristic adjustment unit 41 and the third frequency characteristic adjustment unit 43 will be described.

The first frequency characteristic adjustment unit 41 has a configuration in which the short stub 1 of the first frequency characteristic adjustment unit 11 according to the first exemplary embodiment is replaced with a lumped constant line including inductors L41 to L43, and capacitors C41 and C42. The inductors L41 to L43 are connected in series in this order between the open point P1 and the ground. The capacitor C41 is connected between a connection point between the inductor L41 and the inductor L42, and the ground. The capacitor C42 is connected between a connection point between the inductor L42 and the inductor L43, and the ground.

The third frequency characteristic adjustment unit 43 has a configuration in which the short stub 3 of the third frequency characteristic adjustment unit 13 according to the first exemplary embodiment is replaced with a lumped constant line including inductors L44 to L46, and capacitors C43 and C44. The third frequency characteristic adjustment unit 43 has a configuration similar to the first frequency characteristic adjustment unit 41. Thus, the inductors L44 to L46 are connected in series in this order between the open point P2 and the ground. The capacitor C43 is connected between a connection point between the inductor L44 and the inductor L45, and the ground. The capacitor C44 is connected between a connection point between the inductor L45 and the inductor L46, and the ground.

When the frequency of the passing signal is low (the frequency f1), since the effect of the inductor becomes dominant, the imaginary part of the admittance Y1 of the first frequency characteristic adjustment unit 41, or the sign of the susceptance, is negative. When the frequency of the passing signal is high (the frequency f2), since the effect of the capacitor becomes dominant, the imaginary part of the admittance Y1 of the first frequency characteristic adjustment unit 41, or the sign of the susceptance, is positive.

Similarly, when the frequency of the passing signal is low (the frequency f1), since the effect of the inductor becomes dominant, the imaginary part of the admittance Y3 of the third frequency characteristic adjustment unit 43, or the sign of the susceptance, is negative. When the frequency of the passing signal is high (the frequency f2), since the effect of the capacitor becomes dominant, the imaginary part of the admittance Y3 of the third frequency characteristic adjustment unit 43, or the sign of the susceptance, is positive.

Therefore, according to the present configuration, by designing the inductors L41 to L46 and the capacitors C41 to C44 to satisfy the above-described expressions (1) to (3), it is possible to achieve the antenna capable of corresponding to two frequency bands with a simple configuration as in the first exemplary embodiment.

Fifth Exemplary Embodiment

Figure 8:
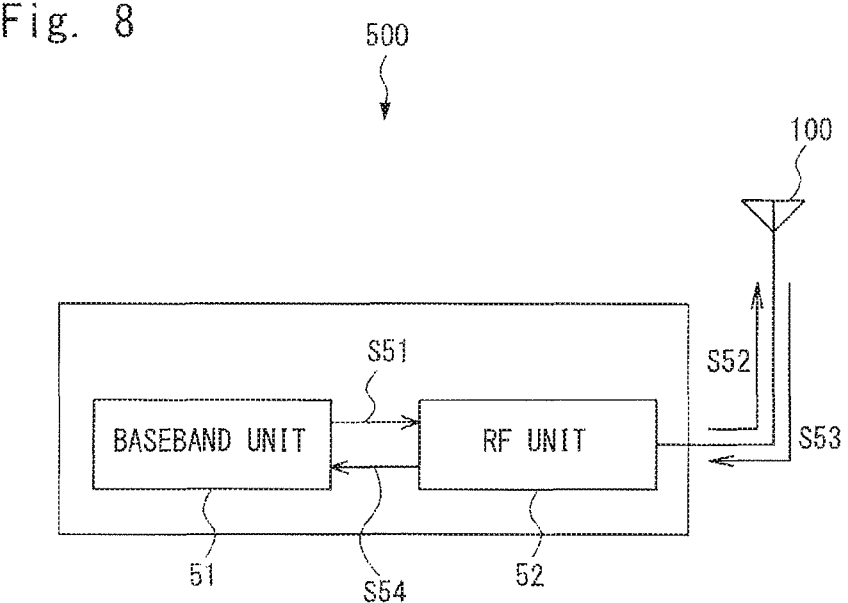
FIG. 8 is a block diagram schematically illustrating a configuration of a wireless communication device according to a fifth exemplary embodiment.

A wireless communication device 500 according to a fifth exemplary embodiment will be described. FIG. 8 is a block diagram schematically illustrating a configuration of the wireless communication device 500 according to the fifth exemplary embodiment.

The wireless communication device 500 includes the antenna 100 according to the first exemplary embodiment, a baseband unit 51 and an RF unit 52. The baseband unit 51 handles a baseband signal S51 before modulation and a received signal S54 after demodulation. The RF unit 52 modulates the baseband signal S51 from the baseband unit 51 and outputs a modulated transmission signal S52 to the antenna 100. The RF unit 52 also demodulates a received signal S53 which is received by the antenna 100 and outputs the received signal S54 after demodulation to the baseband unit 51. The antenna 100 radiates the transmission signal S52 or receives the received signal S53 radiated by an external antenna.

As described above, according to the present configuration, it can be understood that it is possible to specifically configure the wireless communication device capable of wireless communication with outside by using the antenna 100 according to the first exemplary embodiment.

Further, according to the present configuration, since the tip of the antenna is grounded, unlike a general dipole antenna in which the tip is electrically opened, electric charges of lightning strikes can be released to a ground conductor. Therefore, it is possible to protect a transceiver connected to an input terminal from surge voltage due to the lightning strikes.

Other Exemplary Embodiments

Figure 9:
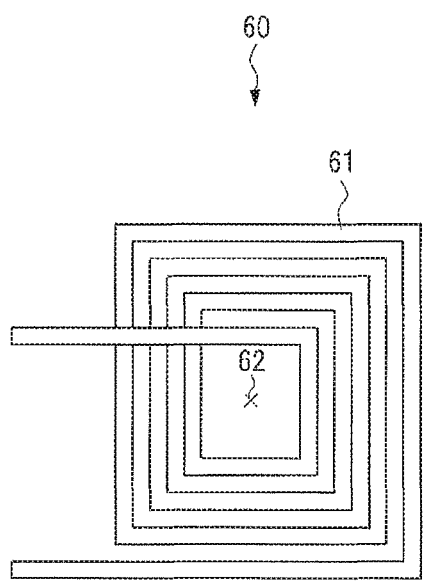
FIG. 9 is a diagram illustrating a configuration example of an inductor configured by a spiral line.
Figure 10:
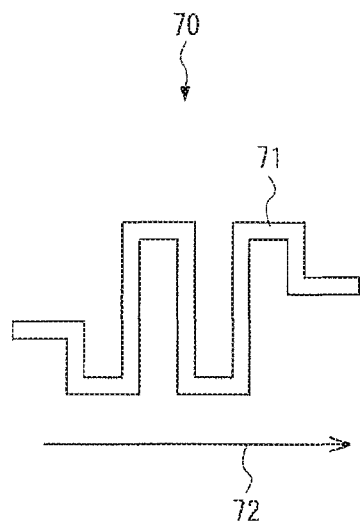
FIG. 10 is a diagram illustrating a configuration example of an inductor configured by a meander line.

The present invention is not limited to the above-described exemplary embodiments, and can be modified as appropriate without departing from the scope of the invention. For example, an inductor configured by, for example, a spiral line or a meanda line may be used as each inductor described above. FIG. 9 is a diagram illustrating a configuration example of an inductor configured by the spiral line. The spiral line 60 illustrated in FIG. 9 is configured such that the line 61 circulates in a spiral shape around a center point 62 that is a center of circulation. FIG. 10 is a diagram illustrating a configuration example of an inductor configured by the meander line. The meander line 70 illustrated in FIG. 10 is formed by folding the line 71 alternately along a direction orthogonal to the traveling direction 72 of the line. Note that the above-described spiral line and meander line are merely examples and a spiral line and a meander line having other configurations may constitute the inductor. Inductors including lines other than the spiral line and the meander line may be also used.

Also in the third and fourth exemplary embodiments described above, as in the second exemplary embodiment, the second frequency characteristic adjustment unit 22 may be used to form an antenna corresponding to three frequency bands.

In the fifth exemplary embodiment described above, it is described that the antenna 100 is used according to the first exemplary embodiment and, however, it goes without saying that the antenna other than the antenna 100 described in the above-described exemplary embodiments can be used.

Figure 11:
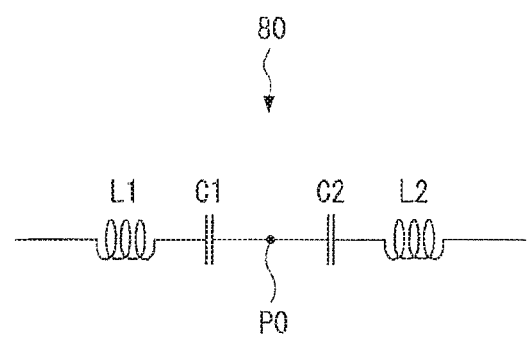
FIG. 11 is a diagram illustrating another configuration example of a feeding-side frequency characteristic adjustment unit.
Figure 12:
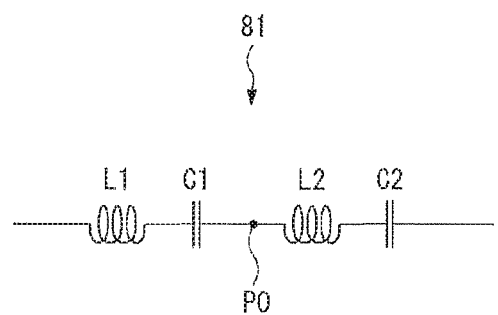
FIG. 12 is a diagram illustrating another configuration example of the feeding-side frequency characteristic adjustment unit.

In the second frequency characteristic adjustment unit according to the above-described exemplary embodiments, although it is described that the inductors L1 and L2 connected in series are connected between the capacitor C1 and the capacitor C2, this is merely an example. FIGS. 11 and 12 are diagrams illustrating other configuration examples of the second frequency characteristic adjustment unit. As in a second frequency characteristic adjustment unit 80 illustrated in FIG. 11, the capacitor C1 and the capacitor C2 connected in series may be connected between the inductor L1 and the inductor L2. As in a second frequency characteristic adjustment unit 81 illustrated in FIG. 12, the inductor L1, L2 and the capacitor C1, C2 may be alternately connected. This also applies to the second frequency characteristic adjustment unit 22.

In the above-described exemplary embodiments, although it is described that the admittance Y1 of the first frequency characteristic adjustment unit is equal to the admittance Y3 of the third frequency characteristic adjustment unit (Y1=Y3), it is merely an example. As long as the expressions (1) to (3) are satisfied, the admittance Y1 of the first frequency characteristic adjustment unit and the admittance Y3 of the third frequency characteristic adjustment unit may be different.

The present invention has been described above with reference to the exemplary embodiments, but the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2015-59226, filed on Mar. 23, 2015, the disclosure of which is incorporated herein in its entirety by reference.

REFERENCE SIGNS LIST 1, 3 SHORT STUBS
10, 30 FEEDING UNITS
11, 21, 41 FIRST FREQUENCY CHARACTERISTIC ADJUSTMENT UNITS
12, 22, 80, 81 SECOND FREQUENCY CHARACTERISTIC ADJUSTMENT UNITS
13, 23, 43 THIRD FREQUENCY CHARACTERISTIC ADJUSTMENT UNITS
24, 25 TRANSMISSION LINES
31A, 31B FEEDING LINES
51 BASEBAND UNIT
52 RF UNIT
60 SPIRAL LINE
61, 71 LINES
62 CENTER POINT
70 MEANDA LINE
72 TRAVELING DIRECTION
100, 200, 300, 400 ANTENNAS
500 WIRELESS COMMUNICATION UNIT
C1 TO C4, C41 TO C44 CAPACITORS
L1 TO L4, L10, L41 TO L46 INDUCTORS
P0 CENTER POINT
P1, P2 OPEN POINTS
TS FEEDING TERMINAL

The invention claimed is:

1. An antenna comprising:
a first frequency characteristic adjustment unit whose susceptance varies in response to a frequency of an input signal;
a second frequency characteristic adjustment unit connected to the first frequency characteristic adjustment unit, a reactance of the second frequency characteristic adjustment unit varying in response to the frequency of the input signal;
a third frequency characteristic adjustment unit connected to the second frequency characteristic adjustment unit, a susceptance of the third frequency characteristic adjustment unit varying in response to the frequency of the input signal; and
a feeding unit configured to input a signal of any frequency in a plurality of different frequencies to the second frequency characteristic adjustment unit; wherein
a sign of the reactance at the frequency of the signal input from the feeding unit is the same as a sign of the susceptance,
a first configuration between an end connected to the first frequency characteristic adjustment unit and a midpoint in the second frequency characteristic adjustment unit and a second configuration between an end connected to the third frequency characteristic adjustment unit and the midpoint in the second frequency characteristic adjustment unit are symmetric with respect to the midpoint,
the first configuration comprises a plurality of elements connected in series between the end connected to the first frequency characteristic adjustment unit and the midpoint,
the second configuration comprises a plurality of elements connected in series between the end connected to the third frequency characteristic adjustment unit and the midpoint, and
the feeding unit inputs the signal of any frequency in the plurality of different frequencies to one or both of a lint element adjacent to the midpoint that is disposed in the first configuration and a second element adjacent to the midpoint that is disposed in the second configuration.

2. The antenna according to claim 1, wherein the following expression is established, $$\frac{1}{Y1} + \frac{1}{Y3} + X2 = 0$$

where the susceptance of the first frequency characteristic adjustment unit is Y1, the reactance of the second frequency characteristic adjustment unit is X2, and the susceptance of the third frequency characteristic adjustment unit is Y3.

3. The antenna according to claim 1, wherein the first frequency characteristic adjustment unit and the third frequency characteristic adjustment unit are connected to interpose the second frequency characteristic adjustment unit therebetween to face each other.

4. The antenna according to claim 1, wherein
at a first frequency, the sign of the reactance of the second frequency characteristic adjustment unit is negative, and the signs of the susceptances of the first frequency characteristic adjustment unit and the third frequency characteristic adjustment unit are negative, and
at a second frequency different from the first frequency, the sign of the reactance of the second frequency characteristic adjustment unit is positive, and the signs of the susceptances of the first frequency characteristic adjustment unit and the third frequency characteristic adjustment unit are positive.

5. The antenna according to claim 4, wherein the first frequency is lower than the second frequency.

6. The antenna according to claim 5, wherein the second frequency characteristic adjustment unit configured by one or more inductors and one or more capacitors connected in series.

7. The antenna according to claim 6, wherein
the first frequency characteristic adjustment unit and the second frequency characteristic adjustment unit are connected via a first open point, and
the second frequency characteristic adjustment unit and the third frequency characteristic adjustment unit are connected via a second open point.

8. The antenna according to claim 7, wherein
in the second frequency characteristic adjustment unit,
a first inductor and a first capacitor are connected in series to a side of the first open point with respect to the input of the signal from the feeding unit, and
a second inductor and a second capacitor are connected in series to a side of the second open point with respect to the input of the signal from the feeding unit.

9. The antenna according to claim 8, wherein
the feeding unit comprises an inductor arranged at a position mutually inductively coupled to the first inductor or the second inductor, and
a signal is input to the second frequency characteristic adjustment unit by being induced by the inductor of the feeding unit.

10. The antenna according to claim 9, wherein
the feeding unit comprises:
 a first feeding line connecting to an end of the side of the second open point of the first inductor and the first capacitor connected in series to the side of the first open point with respect to the input of the signal from the feeding unit and inputting a normal phase signal; and
 a second feeding line connecting to an end of the side of the first open point of the second inductor and the second capacitor connected in series to the side of the second open point with respect to the input of the signal from the feeding unit and inputting a reversed phase signal.

11. The antenna according to claim 8, wherein
the second frequency characteristic adjustment unit comprises:
 a third inductor connected to the first capacitor in parallel; and
 a fourth inductor connected to the second capacitor in parallel,
the first frequency characteristic adjustment unit comprises:
 a first line one end of which is connected to the first open point; and
 a third capacitor connected between the other end of the first line and the ground, and the third frequency characteristic adjustment unit comprises:
 a second line one end of which is connected to the first open point; and
 a fourth capacitor connected between the other end of the second line and the ground.

12. The antenna according to claim 8, wherein
the first frequency characteristic adjustment unit comprises:
 a plurality of inductors connected in series between the first open point and the ground; and
 a plurality of capacitors connected to one or more of the plurality of inductors in parallel, and
the third frequency characteristic adjustment unit comprises:
 a plurality of inductors connected in series between the second open point and the ground; and
 a plurality of capacitors connected to one or more of the plurality of inductors in parallel.

13. The antenna according to claim 7, wherein
the first frequency characteristic adjustment unit includes a first short stub connected between the first open point and a ground and having an electric length shorter than a quarter of a wavelength corresponding to the first frequency and longer than a quarter of a wavelength corresponding to the second frequency, and
the third frequency characteristic adjustment unit includes a second short stub connected between the second open point and the ground and having an electric length shorter than the quarter of the wavelength corresponding to the first frequency and longer than the quarter of the wavelength corresponding to the second frequency.

14. A wireless communication device comprising:
an antenna capable of corresponding to a plurality of frequencies;
a baseband unit configured to output a baseband signal before modulation and receive a signal generated by demodulating a received signal; and
an RF unit configured to modulate the baseband signal to output a transmission signal to the antenna and output the signal generated by demodulating the received signal received from the antenna to the baseband unit, wherein
the antenna comprises:
 a first frequency characteristic adjustment unit whose susceptance varies in response to a frequency of an input signal;
 a second frequency characteristic adjustment unit connected to the first frequency characteristic adjustment unit, a reactance of the second frequency characteristic adjustment unit varying in response to the frequency of the input signal;
 a third frequency characteristic adjustment unit connected to the second frequency characteristic adjustment unit, a susceptance of the third frequency characteristic adjustment unit varying in response to the frequency of the input signal; and
 a feeding unit configured to input a signal of any frequency in a plurality of different frequencies to the second frequency characteristic adjustment unit,
a sign of the reactance at the frequency of the signal input from the feeding unit is the same as a sign of the susceptance,
a first configuration between an end connected to the first frequency characteristic adjustment unit and a midpoint in the second frequency characteristic adjustment unit and a second configuration between an end connected to the third frequency characteristic adjustment unit and the midpoint in the second frequency characteristic adjustment unit are symmetric with respect to the midpoint, the first configuration comprises a plurality of elements connected in series between the end connected to the first frequency characteristic adjustment unit and the midpoint, the second configuration comprises a plurality of elements connected in series between the end connected to the third frequency characteristic adjustment unit and the midpoint, and the feeding unit inputs the signal of any frequency in the plurality of different frequencies to one or both of a first element adjacent to the midpoint that is disposed in the first configuration and a second element adjacent to the midpoint that is disposed in the second configuration.

* * * * *

UNITED STATES PATENT AND TRADEMARK OFFICE
CERTIFICATE OF CORRECTION

PATENT NO. : 10,411,351 B2
APPLICATION NO. : 15/551814
DATED : September 10, 2019
INVENTOR(S) : Tomoya Kaneko et al.

It is certified that error appears in the above-identified patent and that said Letters Patent is hereby corrected as shown below:

In the Specification

Column 1, Background Art, Line 49; Delete "it-shape." and insert --$\pi$-shape.-- therefor Column 6, Description of Embodiments, Line 13; Delete "length 1" and insert --length l-- therefor Column 6, Description of Embodiments, Line 29; Delete "length 1" and insert --length l-- therefor Column 8, Description of Embodiments, Line 2; Delete "w" and insert --$\omega$-- therefor In the Claims Column 12, Line 47; In Claim 1, delete "lint" and insert --first-- therefor Column 13, Line 64; In Claim 11, delete "first" and insert --second-- therefor Signed and Sealed this
Twenty-eighth Day of January, 2020

Andrei Iancu
*Director of the United States Patent and Trademark Office*